United States Patent [19]

Bird

[11] 4,071,372

[45] Jan. 31, 1978

[54] SILICON NITRIDE NGV'S AND TURBINE BLADES

[75] Inventor: Jack Raymond Bird, Chellaston, England

[73] Assignee: The Secretary of Defence, in Her Brittanic Majesty's Government of the United Kingdom of Great Britain and Northern Ireland, London, United Kingdom

[21] Appl. No.: 392,005

[22] Filed: Aug. 27, 1973

Related U.S. Application Data

[63] Continuation of Ser. No. 194,014, Oct. 29, 1971, abandoned.

[30] Foreign Application Priority Data

Nov. 3, 1970 United Kingdom ............... 52174/70

[51] Int. Cl.$^2$ ............................................. C04B 35/58
[52] U.S. Cl. ................................... 106/73.5; 364/332; 264/DIG. 44
[58] Field of Search ................. 264/65, 332, DIG. 44, 264/221; 106/73.5

[56] References Cited

U.S. PATENT DOCUMENTS

| 3,264,338 | 8/1966 | Roach | 264/332 |
| 3,819,787 | 6/1974 | Coe | 264/332 |

FOREIGN PATENT DOCUMENTS

| 1,902,707 | 9/1969 | Germany | 264/332 |

OTHER PUBLICATIONS

Oudemans, "Continuous Hot Pressing," *Phillips Technical Review*, vol. 29, No. 2, (1968) pp. 45-51.

*Primary Examiner*—Donald J. Arnold
*Assistant Examiner*—John Parrish
*Attorney, Agent, or Firm*—Cushman, Darby & Cushman

[57] ABSTRACT

The invention concerns a method of making an article from silicon nitride powder and a fluxing agent. The method comprises hot pressing a first section of the silicon nitride article, transferring the pressed section to a further mould large enough to accomodate sufficient silicon nitride powder and fluxing agent to produce the other section of the article, and subsequently hot pressing the contents of the mould to solidify the silicon nitride powder and fluxing agent into the second section of the article which becomes bonded to the first section.

7 Claims, No Drawings

SILICON NITRIDE NGV'S AND TURBINE BLADES

This is a continuation, of application Ser. No. 194,014 filed Oct. 29, 1971, and now abandoned.

This invention relates to forming ceramic articles and is particularly though not exclusively concerned with forming parts for gas turbine engines.

Hot pressed silicon nitride has many properties which make it attractive for use in gas turbine engines, particularly in the areas of such engines where extremes of heat are experienced. Typical of such areas are the exhaust from the combustion equipment and the high pressure turbine. The nozzle guide vanes and high pressure turbine blades which are located in these two areas respectively are typical of parts for which hot pressed silicon nitride is suitable in many respects. Such parts differ considerably in the wall thicknesses of their various sections, e.g. the aerofoil sections which may be hollow will have walls which are less thick than say the platforms or shrouds.

When making articles from silicon nitride powder it is desirable that the thickness of the article does not vary too much from the norm otherwise when the powder is hot pressed with a fluxing agent, and density of the article may vary from one location to another, e.g. the relatively thin sections may be completely densified whilst the relatively thick sections may only be densified.

It is an object of the present invention to provide a method whereby articles having sections of different wall thicknesses may be made in hot pressed silicon nitride.

According to the present invention a method of manufacturing an article from hot pressed silicon nitride in which the formed article comprises at least two sections of differing wall thickness comprises the method including the steps of hot pressing a first mixture of silicon nitride powder and a fluxing agent to form a first one of the said section, placing said formed first section in a mould which is adapted to accommodate both of the said sections, filling the mould with a sufficient quantity of silicon nitride powder and a fluxing agent so that the second one of said sections may be formed by hot pressing the said second mixture the resultant said second section becoming bonded to the said first section.

Preferably graphite cores are placed in the mould prior to the introduction of the mixture of silicon nitride powder and fluxing agent into the mould, the graphite cores being removed after the or each section being formed by hot pressing such that internal ducts are formed in the interior of the or each section.

Preferably one of the said sections comprises the aerofoil shaped portion of a blade suitable for use in a gas turbine engine.

Preferably the other one of said sections comprises either the platform or a shroud of a gas turbine engine blade.

The mixture of silicon nitride powder and fluxing agent may comprise 95% by weight silicon nitride powder and 5% by weight magnesium oxide and the mixture may be hot pressed at a temperature of about 1850° C and a pressure of 1,100 p s i. This method and others of hot pressing silicon nitride is disclosed and claimed in U.K. Pat. No. 970,639.

The invention may be put into practice according to the following example which is concerned with the manufacture of a high pressure turbine blade for a gas turbine engine. Such a blade will typically consist of an aerofoil portion, a platform and a shroud, all of which may have substantially different wall thicknesses depending upon the particular design. In this example it is assumed that the platform and shroud have wall thicknesses which are substantially the same and that the aerofoil portion has a substantially different wall thickness to either of these two parts.

A predetermined quantity of silicon nitride powder and magnesium oxide are mixed in the proportion 95% by weight silicon nitride and 5% by magnesium oxide and the resulting mixture is poured into a mould which is suitably shaped to produce the platform and shroud, although these parts may be formed in separate moulds if desired. The mould is then closed and the mixture is hot pressed at a temperature of about 1750° C and a pressure of about 100 p s i.

When the mixture has densified, the formed platform and shroud are removed from the mould and placed in another mould which is shaped both to receive the platform and shroud and to form the aerofoil portion of the blade.

A further quantity of powder mixture is then poured into the mould and is hot pressed as set out above. This operation both forms the aerofoil portion and bonds the aerofoil portion to the platform and shroud.

This process can form a blade to very close tolerances and reduces any machining which may be required.

If it is required that the aerofoil portion has cooling passages these can be provided by placing graphite cores in the mould prior to the pouring of the powder mixture from which the aerofoil portion is to be formed.

The method of hot pressing the silicon nitride and other methods are described and claimed in U.K. Pat. No. 970,639 and are suitable for use in performing this invention.

Whilst the invention has been described by way of example only, with reference to a high pressure turbine blade, the invention may equally well be applied to any article which is required to be made from hot pressed silicon nitride.

We claim:

1. A method of manufacturing a unitary article from hot pressed silicon nitride having at least two portions, each portion thereof being formed in a separate hot pressing operation, the formed article having at least two sections of differing wall thickness, the method including the steps of
   a. hot pressing a first mixture of silicon nitride powder and a fluxing agent for said silicon nitride in a first mold to form a first one of the said sections,
   b. placing said first section in a second mould which is adapted to accommodate both of the said sections,
   c. filling the mould with a sufficient quantity of silicon nitride powder and a fluxing agent for said silicon nitride to form the second one of the said sections by not pressing the said second mixture, and
   d. hot pressing said second mixture, the resultant to densify the added silicon nitride powder and fluxing agent together to form a second section, while at the same time bonding said second section to the said first section, the entire article completely densified throughout.

2. A method of manufacturing an article as claimed in claim 1 in which graphite cores are placed in the mould prior to the introduction of the mixture of silicon nitride powder and the fluxing agent for said silicon nitride into the mould in steps (a) or (c) or both, the graphite cores being removed after the section has been formed by hot pressing such that internal ducts are formed in the interior of the section.

3. A method of manufacturing an article as claimed in claim 1 in which one of the said sections comprise the aerofoil portions of a blade suitable for use in a gas turbine engine.

4. A method of manufacturing an article as claimed in claim 2, in which one of the said sections comprises the aerofoil portions of a blade suitable for use in a gas turbine engine.

5. A method of manufacturing an article as claimed in claim 3 in which the other one of said sections comprises either the platform or shroud of a gas turbine engine blade.

6. A method of manufacturing an article as claimed in claim 4 in which the other one of said sections comprises either the platform or shroud of a gas turbine engine blade.

7. A silicon nitride blade suitable for use in a gas turbine engine made by the method as claimed in claim 1.

* * * * *